United States Patent [19]

Bergstrom

[11] Patent Number: 4,508,593
[45] Date of Patent: Apr. 2, 1985

[54] PROCESS FOR RECOVERY OF SULFUR DIOXIDE LIBERATED IN THE CHEMICAL PULPING OF LIGNOCELLULOSIC MATERIAL

[75] Inventor: John R. Bergstrom, Domsjo, Sweden

[73] Assignee: Mo och Domsjo Aktiebolag, Ornskoldsvik, Sweden

[21] Appl. No.: 390,584

[22] Filed: Jun. 21, 1982

[30] Foreign Application Priority Data

Jun. 22, 1981 [SE] Sweden ................. 8103892

[51] Int. Cl.³ ............... D21C 11/00; D21C 11/06
[52] U.S. Cl. ................. 162/29; 162/30.11; 162/35; 162/36; 162/38; 423/486; 423/522; 423/539; 423/DIG. 3
[58] Field of Search ............. 423/DIG. 3, 467, 486, 423/522, 242 R, 539, 544; 162/30.11, 33, 30.1, 15, 16, 29, 36, 35, 38, 39, 64

[56] References Cited
U.S. PATENT DOCUMENTS 4,098,639  7/1978  Norcus et al. ............... 423/539
4,393,035  7/1983  Fredette ..................... 423/522
4,393,036  7/1983  Fredette ..................... 423/522

Primary Examiner—Steve Alvo

[57] ABSTRACT

A process is provided for the recovery of sulfur dioxide liberated in the chemical pulping of lignocellulosic material, which comprises
(1) collecting sulfur dioxide-containing gas emitted during the pulping and separating it into at least two portions;
(2) contacting at least one portion with chlorine gas, thereby forming a gaseous mixture comprising sulfur dioxide and chlorine;
(3) effecting reaction of sulfur dioxide, chlorine and water to form hydrochloric acid and sulfuric acid while forming an intimate dispersion in said gaseous mixture of an aqueous solution of hydrochloric acid and sulfuric acid;
(4) dissolving said hydrochloric acid and sulfuric acid in said solution;
(5) recovering said solution and separating it from substantially sulfur dioxide-free residual gas.

9 Claims, 2 Drawing Figures

PROCESS FOR RECOVERY OF SULFUR DIOXIDE LIBERATED IN THE CHEMICAL PULPING OF LIGNOCELLULOSIC MATERIAL

When cellulose pulp is manufactured in the usual cyclic pulping system by reacting lignocellulosic material, for example wood, with a cooking liquor containing sodium and sulfur, and the waste cooking liquor processed for chemicals recovery and chemicals recycling, the amount of sulfur in circulation in the system is very high. While theoretically it should be possible in, for example, a sulfate pulp mill to recover and recycle the entire amount of sulfur initially charged, by careful recovery of the sulfur, this is not possible in practice. Sulfur is lost partly in gaseous form to the atmosphere, and partly in liquid form in the waste liquor stream. In order to replace sulfur losses, it is normal to add sodium sulfate to the system, which is how the sulfate method obtained its name.

However, the sulfate pulping process is not supplied with sulfur only in the form of sodium sulfate. Sulfur enters the system from at least three additional sources:
(a) sulfur in the incoming wood
(b) sulfur in the fuel, for example oil, used in the lime sludge reburning kiln
(c) sulfur in sulfuric acid supplied for tall oil cooking Thus, when manufacturing sulfate pulp a balance must be maintained between all of the sulfur supplied to the process, and the sulfur losses. Cellulose pulp manufacturers have tried for a long time to reduce sulfur losses. These attempts have primarily been directed towards improvements in liquid recovery, for example, by using closed screening, or improved washing of the pulp. Less attention has been paid to recovery of sulfur-containing gases.

If, in addition, the cellulose pulp is bleached with, inter alia, chlorine dioxide, and this bleaching chemical is produced on-site at the pulping plant, the sulfur balance is complicated still further. There are a number of different ways in which chlorine dioxide can be produced. One method normally used is the so-called Mathieson process. Competitive methods include the SVP-process developed by Hooker Chemicals and Plastics Corporation, and the R3-process developed by Erco Industries Limited. The latter two processes are quite similar. Erco has also developed a method known as the R7-process, which is a modification of the R3-process.

In the Mathieson process, sulfur dioxide and sulfuric acid are charged to the chlorine dioxide generator in addition to sodium chloride and sodium chlorate. These chemicals are purchased outside the plant and are charged to the system as fresh chemicals, to start the reaction, and, to cover losses of chlorine and chlorides, soluble chloride is charged; sulfur dioxide is charged directly to the generator and reduces the chlorine produced to chloride. The chloride reduces chlorate to chlorine dioxide. Chloride is oxidized to chlorine. In this process there is obtained a liquid byproduct in the form of residual acid containing both sodium sulfate and sulfuric acid. Since sodium sulfate is used as a loss-covering chemical when digesting wood in accordance with the sulfate process, this residual acid is often used to cover the sodium and sulfur losses in the chemical cycle in the sulfate mill. With the sulfuric acid contributed by the residual acid, however, excessive sulfur is taken into the mill, resulting in increased sulfur emissions both in liquid and in gaseous form. While a number of processes have been suggested for recovering this excess sulfur, these processes are expensive and/or technically difficult to put into effect.

In order to balance the chemical consumption in the manufacture of chlorine dioxide in accordance with the SVP-process and the R3-process, hydrochloric acid and sulfuric acid are also added, in addition to sodium chloride and sodium chlorate. The chloride reduces chlorate as in the Mathieson process, but in the R3 and SVP processes, no sulfur dioxide is charged directly to the generator. The acidity is lower which makes it possible to use hydrogen chloride instead of sodium chloride. In this way, it is possible to control the sodium input. As the chlorine is not reduced, it will leave the generator with the chlorine dioxide gas. The byproduct obtained when practicing these processes is sodium sulfate, which is supplied to the pulping chemical recovery cycle. With these processes, the problem is practically the reverse of the former processes, since although there is no sulfur excess, the supply of sodium sulfate from chlorine-dioxide manufacture is not always sufficient to cover the sulfur losses. This means that more fresh sodium sulfate must be brought in, which increases the costs of manufacturing bleached sulfate pulp.

There is no difference in producing chlorine dioxide according to the R3 and R7 processes. In the R3 process, the chlorine product is used directly in bleaching after addition of water or alkali. In the R7 process the chlorine produced is reacted with fresh sulfur dioxide and the hydrogen chloride and sulfuric acid produced are recirculated to the generator.

It is thus apparent that in use of the known techniques in the manufacture of, for example, sulfate pulp and chlorine-dioxide bleached sulfate pulp, it has not been possible to achieve a proper balance between the sulfur supplied to the system and that lost therefrom.

Everyone is agreed that the release of sulfur, and in particular the release of sulfur-containing gases, is a serious environmental problem, and that such release should be kept to a minimum.

The present invention provides assistance in resolving these problems, by collecting sulfur dioxide-containing gas emitted during the pulp-manufacturing process and separating it into at least two portions, contacting at least one portion with chlorine gas, thereby forming a gaseous mixture containing sulfur dioxide and chlorine, and then contacting the sulfur dioxide-containing gas with an aqueous liquid containing sulfuric acid and hydrochloric acid, thereby converting and removing the sulfur dioxide as sulfuric acid so as to obtain a residual gas substantially free from sulfur dioxide.

The process according to the invention for the recovery of sulfur dioxide liberated in the chemical pulping of lignocellulosic material comprises (1) collecting sulfur dioxide-containing gas emitted during the pulping and separating it into at least two portions; p (2) contacting at least one portion with chlorine gas, thereby forming a gaseous mixture comprising sulfur dioxide and chlorine;

(3) effecting reaction of sulfur dioxide, chlorine and water to form hydrochloric acid and sulfuric acid while forming an intimate dispersion in said gaseous mixture of an aqueous solution of hydrochloric acid and sulfuric acid;

(4) dissolving said hydrochloric acid and sulfuric acid in said solution;

(5) recovering said solution and separating it from substantially sulfur dioxide-free residual gas.

Figure 1:
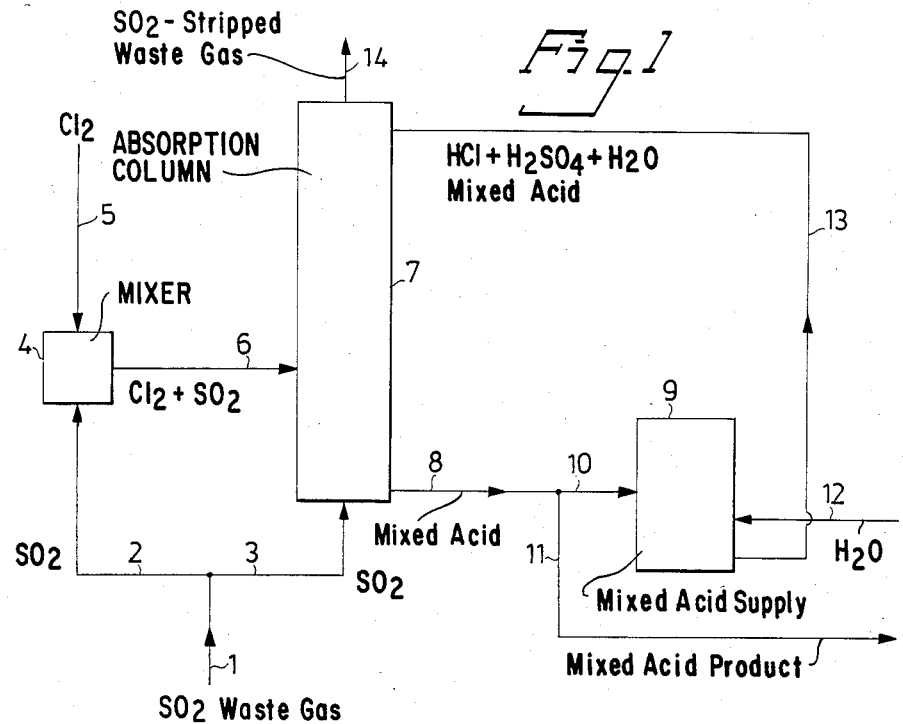
FIG. 1 is a flow diagram showing the stages in the preferred embodiment of the method according to the invention illustrated in Example 1.

In sulfate pulp mills, and also other chemical pulp mills, gases are released to the atmosphere at a number of locations. These gases normally contain sulfur compounds, of which sulfur dioxide is predominant. These gases may also contain other sulfur-containing compounds, such as hydrogen sulfide and organic sulfur compounds. Thus, the term "sulfur dioxide-containing gas" as used in this specification and claims encompasses any mixtures of sulfur dioxide with any one or more sulfur compounds, such as those mentioned above.

Sulfur dioxide-containing gas is released from the lime sludge reburning kiln and also the soda recovery boiler, where concentrated waste pulping cooking liquor is combusted. Gases from the digester house and the evaporator plant also contain foul smelling organic and inorganic sulfur compounds, including, among others, gaseous alkyl mercaptans RSH, such as methyl mercaptan, and gaseous alkyl sulfides $R(S)_n R$, such as dimethyl sulfide and dimethyl disulfide, R being lower alkyl and n being a number from 1 to about 3. When collected, these gases are burned in a separate furnace. The flue gas leaving the furnace is a further example of a sulfur dioxide-containing gas.

The aforementioned gas mixtures have a sulfur content within the range from about 0.005 to about 15% calculated in percent by volume sulfur dioxide.

In accordance with the invention, sulfur dioxide-containing gas can be collected from any of the above-mentioned sources (and also from any other sources) from which they are liberated and separated into at least two gas portions. Of course, if sulfur dioxide-containing gas from two sources are used, gas from one source can be used as one portion, and gas from the other source as another portion.

At least one gas portion is brought into contact with chlorine gas. The chlorine may be mixed with the gas in concentrations within the range of from about 0.5 to about 100% by volume of the gas mixture to which the chlorine is added. Preferably, however, the chlorine is present in a concentration within the range from about 40 to about 100%, and suitably within the range from about 60 to about 100%. Thus, there is obtained a gas mixture which contains both sulfur dioxide (and possibly other sulfur compounds) and chlorine gas.

Both this gas mixture and the other remaining portion of the sulfur dioxide-containing gas separately or together are then brought into contact with an aqueous liquid containing hydrochloric acid and sulfuric acid, herein designated "mixed acid". The mixed acid is distributed in the gaseous mixture in finely divided form, and can be passed in countercurrent or concurrent flow thereto in a continuous stream, in a continuous or semi-continuous flow process. The process step can be referred to as a washing, scrubbing or stripping of the gas with the mixed acid. In this step substantially all of the sulfur dioxide and other sulfur-containing compounds and also all the chlorine are removed from the gas mixture. The chemical reaction that takes place is shown in the following reaction equation:

$$SO_2 + Cl_2 + 2H_2O \rightarrow 2HCl + H_2SO_4$$

In accordance with a preferred embodiment of the invention, the portion of the gaseous mixture containing sulfur dioxide and chlorine is brought together with the other portion of the sulfur dioxide-containing gas during the washing, scrubbing or stripping step, after the other portion of sulfur dioxide-containing gas has been washed with the mixed acid. If the washing step is effected in an absorption tower, the other portion of sulfur dioxide-containing gas is introduced, for example, into the bottom of the tower and flowed upwardly through the tower, while the mixed acid is introduced into the top of the tower, atomized or finely divided through, for example, nozzles, and flowed downwardly through the tower. The sulfur dioxide-containing gas mixture which has been mixed with chlorine is introduced at a location somewhere along the tower, for example, at a point halfway up the tower. It is also possible to introduce the chlorine and sulfur dioxide-containing gas flow at the bottom of the tower.

A pool of mixed acid is maintained at the bottom of the absorption tower. The device or devices through which the gas flows into the bottom of the tower introduces the gas at a level above the liquid level of mixed acid. This upwardly flowing gas stream passes countercurrently to the descending mist of finely-divided mixed acid. This mist, since it has already encountered the stream of mixed chlorine/sulfur dioxide-containing gas, contains dissolved chlorine in addition to hydrochloric acid and sulfuric acid. As a result, practically all sulfur dioxide has been removed from the other portion of the gas flow by absorption by the time that gas flow has reached the point at which it mixes with the gas flow containing a mixture of sulfur dioxide and chlorine, halfway up the tower. As the last mentioned gas flow comes into contact with the finely divided mixed acid mist, absorption and chemical reaction take place, and are substantially complete, by the time the whole of the gas flow reaches the top of the absorption tower.

The gas washing process step can also be carried out in two absorption towers instead of one. The gaseous mixture portion containing sulfur dioxide and chlorine can be fed in at the bottom of one absorption tower, with the mixed acid being charged to the top of the tower. The liquid collected in the bottom of the tower is transported to and introduced to the top of the second tower, while the other portion of the sulfur dioxide-containing gas is charged to the bottom of said tower.

The washing step can be carried out in counterflow or concurrent flow, but it is preferred that the ingoing gas contacts the finely divided mixed acid in counterflow.

A residual gas substantially free from sulfur dioxide is obtained at one end of the absorption tower; and can be vented there, or collected and transported elsewhere. Any other sulfur compounds which may be present are also removed to a very large extent, and possibly substantially completely, so that the gases are substantially sulfur-free.

In addition to sulfur-containing compounds, a number of gaseous compounds of different chemical structure are also extracted from the gaseous mixture by the mixed acid. The mixed acid, now containing relatively higher percentages of hydrochloric acid and sulfuric acid, due to reaction with $SO_2$, is collected at the other end of the absorption tower. The mole ratio Cl/S is about 2. This liquid is conveyed from the absorption tower, and divided, for example, into two portions. The major portion is used for manufacture of chlorine dioxide, or other suitable process requiring mixed acid, while the remainder is passed to storage.

The mixed acid is diluted in the storage vessel with fresh water and/or slightly contaminated water, for example, a weakly acidic aqueous solution. The diluted mixed acid can be used as a washing liquor. Dilution of the mixed acid is effected so that the washing liquor has an acid concentration of within the range from about 2.5 to about 15 moles/l, suitably from 3.5 to 14 moles/l, preferably 5 to 13 moles/l. The temperature of the washing liquor should be within the range from about 0° to about 100° C., suitably from 5° to 50° C., preferably from 15° to 30° C.

The amount of chlorine supplied to the sulfur dioxide-containing gas is critical, and is at least chemically equivalent, i.e., mole for mole, to the amount of sulfur dioxide present. In addition, there should be an excess of chlorine sufficient to provide in the mixed acid washing liquor at the point of introduction of the chlorine/sulfur dioxide gas mixture a free chlorine content within the range from about 0.002 to about 1.3 mg/l, suitably from 0.01 to 0.65 mg $Cl_2$/l, preferably from 0.02 to 0.5 mg $Cl_2$/l.

The amount of chlorine dissolved in the mixed acid washing liquor is established in accordance with known analysis methods. In this respect, it has been found advantageous to use a redox potential measuring system with Pt/Ag/AgCl electrodes. It must be ensured, however, that substantially all the solubilized chlorine is consumed in the mixed acid when said acid is conveyed from the bottom of the absorption tower to the storage vessel for dilution. Otherwise, there is a risk of the diluted mixed acid (the washing liquor) releasing free chlorine when introduced to the top of the absorption tower, and this free chlorine can accompany the purified gas if vented to atmosphere.

Preferably, the major part of the mixed acid washing liquor obtained in the bottom of the absorption tower is used for the manufacture of chlorine dioxide. As previously mentioned, when manufacturing chlorine dioxide in accordance with the so-called SVP and R3 processes, there is required a mixed acid containing hydrochloric acid and sulfuric acid. From the aspect of sulfur balance, it is more advantageous when, for example, pulp produced in a sulfate pulp mill is bleached with chlorine dioxide manufactured on site in the mill. The invention, however, can also be applied in chemical pulp mills where only unbleached pulp is produced, or where the pulp is bleached with chemicals other than chlorine dioxide. In such case, the resultant mixed acid washing liquor is transported to, for example, a pulp mill where chlorine dioxide is manufactured, and/or which has a freestanding chlorine dioxide manufacturing unit.

A number of advantages are afforded by treating sulfur dioxide-containing gases in accordance with the method of the present invention.

The most important is improved care and protection of the environment. When practicing the invention, practically all the sulfur content of the waste gases is recovered, not only sulfur dioxide but other sulfur compounds as well. If this sulfur were not recovered, it would add to other sulfur emissions, and contribute to the acidification of the ground, and lakes and streams. Another advantage is that the invention enables a desirably high sulfidity to be maintained when digesting lignocellulosic material, without the chemical system being depleted of sulfur by the simultaneously occurring high sulfur emissions in diverse gas streams. Consequently, a balance in sulfidity can be achieved which is correct for the pulp mill in question.

When chlorine dioxide is manufactured on site, the process of the invention provides the sulfur required, as the mixed acid washing liquor, making it unnecessary to purchase the amount of sulfur required. The sulfur recovered (in the form of sulfuric acid) can be used repeatedly, resulting in very low chemical costs. Further advantages afforded by the method according to the invention will also be apparent from the working Examples.

The process of the invention can be applied with any digestion processes in which the cooking liquor used contains sodium and sulfur to reduce the need for fresh chemicals in the digestion and in the optional bleaching of the cellulose pulp. While the digestion process of primary interest is sulfate pulping, the invention can also be applied with, for example, the sulfite pulping. The invention can also be applied with pulp-manufacturing methods in which chemical digestion of the lignocellulosic material only constitutes one stage in the manufacturing process, for example, in the manufacture of semichemical pulp.

The following Examples represent preferred embodiments of the invention, in the opinion of the inventor.

EXAMPLE 1

Sulfur dioxide-containing waste gas generated by burning foul gases in a sulfate pulping mill was recovered and treated in accordance with the invention, following the flow scheme illustrated in FIG. 1.

The collected waste gas had a sulfur content corresponding to 9.8 g $SO_2$/Nm$^3$ (normal cubic meter), and was brought into the system through line 1. The gas flow was then divided into two streams, conveyed through line 2 and line 3, respectively.

Line 2 discharged its stream portion into a mixing vessel 4. Concentrated chlorine gas was charged through line 5 into the vessel 4, where the sulfur dioxide-containing gas was mixed with chlorine gas. This mixed gas was passed through line 6 to an absorption column 7. As shown, line 6 was connected to the column 7 at a point one-third of the way up the column. Line 3, through which flowed the other stream of sulfur dioxide-containing gas, discharged its stream at a point slightly up from the bottom of the column 7.

Aqueous liquor containing hydrochloric acid and sulfuric acid (mixed acid) entered the column 7 at the top in finely divided or atomized form. Thus, the gas streams from line 3 and from line 6, respectively, passed in counterflow to the finely divided mixed acid stream, and were washed thereby.

The mixed acid, enriched in both hydrochloric acid and sulfuric acid during its passage through the column, was collected at the bottom of the column 7, and emerged from the column via line 8. The mixed acid was divided into two streams. One stream passed to a supply vessel 9 through a line 10. The other stream was recovered as a product through line 11.

The concentrated mixed acid in the storage vessel 9 was diluted with water passed to the vessel through line 12, and ran through line 13 to the top of the column 7. Sulfur dioxide-stripped waste gas was released from the column 7 through line 14.

The temperature of the mixed acid in line 13 was 21° C., and its acidity (i.e., the combined total content of HCl and $H_2SO_4$) was 13 moles/l. The flows of sulfur dioxide-containing waste gases in lines 2 and 3, the flow of chlorine gas in line 5, and the flow of mixed acid in the line 13 were constantly adjusted so that when the mixed acid was removed from the bottom of the column 7, the amount of chlorine in the acid was always less than 0.002 mg $Cl_2$/l. This corresponded to a redox-potential value of the liquid lower than 550 mV.

The flow of chlorine gas in line 5 was so adjusted that the finely-divided mixed acid, after contacting the gaseous mixture supplied through line 6, had a chlorine content corresponding to 0.18 mg $Cl_2$/l. The liquid had a redox potential value of 750 mV. The sulfur dioxide stripped waste gas released from column 7 through line 14, had a sulfur dioxide content of 6 mg/$Nm^3$. Since the sulfur dioxide content of the untreated waste gas was 9.8 g/$Nm^3$, a surprisingly high 99.93% of the sulfur dioxide had been removed in the process of the invention.

EXAMPLE 2

The method according to the invention was applied in a sulfate pulp mill in which cellulose pulp bleached with chlorine dioxide and chlorine was manufactured. Chlorine dioxide was manufactured on-site in the mill.

Figure 2:
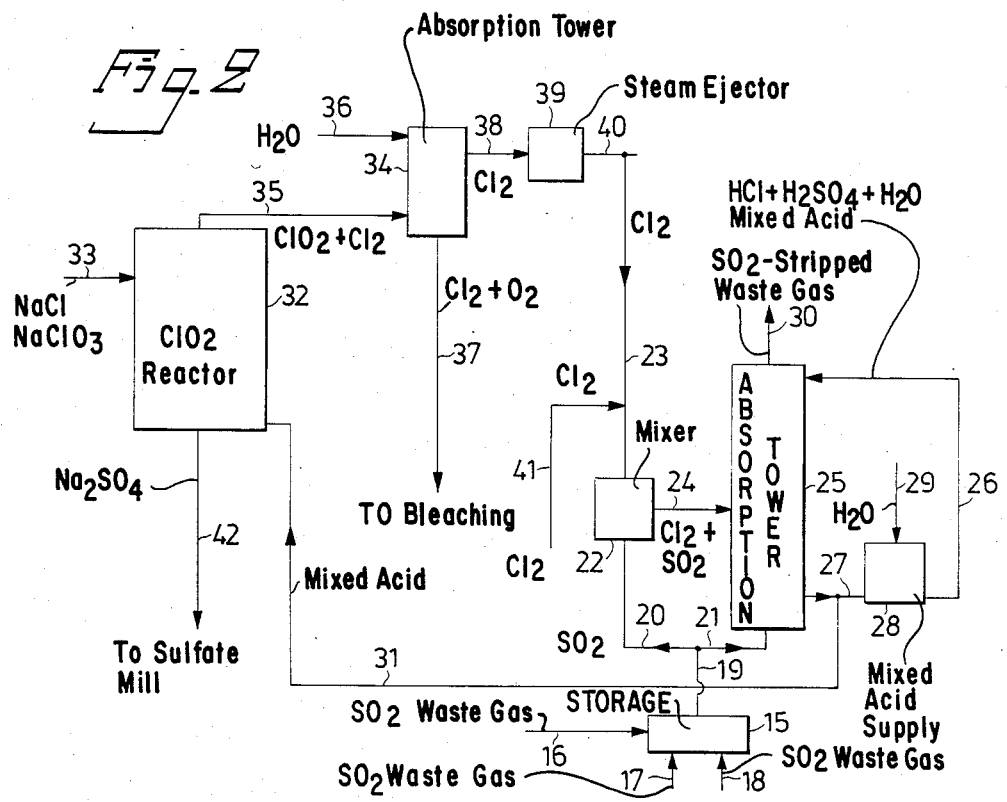
FIG. 2 is a flow diagram showing the stages in the preferred embodiment of the method according to the invention illustrated in Example 2.

The process stages by which the sulfur dioxide-containing waste gases were treated and the use of the mixed acid recovered in accordance with the invention are shown in the flow scheme of FIG. 2.

Sulfur dioxide-containing waste gases were taken from three locations in the sulfate plant, and collected in a vessel 15. Waste gases from a furnace in which collected foul-smelling gases has been burned were conveyed to the vessel through line 16. Waste gases from a soda recovery boiler were conveyed through line 17. Waste gases from a line sludge reburning kiln were conveyed through line 18.

The mixture of sulfur dioxide-containing waste gases was led from the vessel 15 through line 19 and divided into two streams, one in line 20 and one in line 21. The waste gases contained a mixture of sulfur compounds, of which sulfur dioxide was the predominant. The line 20 discharged into vessel 22, in which the sulfur dioxide-containing waste gas was mixed with a stream of chlorine supplied through line 23. The resultant gaseous mixture was passed through a line 24 to an absorption tower 25.

The other sulfur dioxide-containing gas flow stream in line 21 passed to the absorption tower 25.

In the absorption tower 25, these gas streams were contacted in counterflow with an aqueous washing liquor containing hydrochloric acid and sulfuric acid. The washing liquor was charged to the top of the absorption tower through line 26, and finely divided or atomized by nozzles. The washing liquor or mixed acid was collected at the bottom of the absorption tower 25. During their passage up through the tower, the waste gases were stripped of their chlorine and sulfur dioxide content so that as the washing liquor approached the bottom of the column, its sulfuric acid content and hydrochloric acid content increased.

Part of the washing liquor (mixed acid) enriched in hydrochloric acid and sulfuric acid passed through line 27 to a storage vessel 28. Water was charged to the vessel 28 through line 29 in such an amount that the washing liquor had an acidity of 12 moles/l and a temperature of 25° C. The stripped waste gases were removed from the absorption tower 25 through line 30.

The major part of the mixed acid collected in the absorption tower was passed to a chlorine dioxide reactor 32 through lines 27 and 31. Sodium chloride and sodium chlorate entered the chlorine dioxide reactor 32 through line 33 in a molar ratio of 0.1 to 1. According to conventional techniques, such as the R3-process, hydrochloric acid and sulfuric acid are also charged to the chlorine dioxide reactor in addition to sodium chloride and sodium chlorate. In the R7-process, the R3-process is modified so that chlorine formed in the chlorine dioxide reactor is mixed with sulfur dioxide and water, and returned to the chlorine dioxide reactor. This reduces the need for addition of hydrochloric acid and sulfuric acid. The sulfuric dioxide is derived from purchased sulfur dioxide or the on-site combustion of purchased sulfur.

In the method according to the invention, these chemicals were replaced with the mixed acid recovered when scrubbing the waste gases, by supplying mixed acid to the reactor 32 through a line 31. Gaseous chlorine dioxide and chlorine were generated in the reactor 32, and passed, together with stream and air under vacuum, to the absorption tower 34 through line 35. Water was passed to the absorption tower 34 through line 36. Chlorine dioxide and a minor quantity of chlorine were absorbed in the water supplied and passed in liquid form through line 37 to the bleaching stage, for bleaching the pulp. The remaining chlorine and air were passed through line 38 to steam ejector 39.

All of the chlorine recovered was passed through line 40 and line 23 to the mixing vessel 22. The amount of chlorine gas charged, however, was not sufficient, and it was necessary to supply chlorine from a chlorine alkali plant through line 41. The total amount of chlorine charged was so adjusted that subsequent to contacting the gaseous mixture supplied through the line 24 the washing liquor contained 0.17 mg $Cl_2$/l. The amount of chlorine in the mixed acid obtained at the bottom of the absorption column 25 was never greater than 0.001 mg $Cl_2$/l.

A yield of 95% was obtained when producing chlorine dioxide in the reactor 32. The mole ratio of chlorine/chlorine dioxide in the liquid flow through line 37 was found to be 0.07 to 1.

The mill had a yearly production of 300,000 tons of bleached pine sulfate pulp. In the bleaching process, 22 kg of chlorine dioxide were consumed for each ton of pulp. In the manufacture of the chlorine dioxide in reactor 32, sodium sulfate was obtained as a secondary product in an amount, calculated as sulfur dioxide, of 12.1 kg per ton of pulp. This amount of sodium sulfate was passed to the recovery system of the sulfate mill through line 42.

The sulfidity in the mill was 43%, and it was found that the sulfidity could be held constant at this level by collecting the sulfur containing waste gases in lines 16, 17 and 18 and converting the sulfur in the absorption tower 25 to sulfuric acid, which was passed to the chlorine dioxide reactor 32 through line 31 in the form of a mixed acid, whereupon the sulfur, as sodium sulfate, was passed to the chemical recovery system of the mill. In addition, the waste gases leaving the system through line 30 were practically completely free of sulfur-containing compounds.

When carrying out the method according to the invention, sulfur corresponding to 11.7 kg $SO_2$/ton of pulp was removed from the sulfur containing waste gases in lines 16, 17 and 18, and the sulfur returned to the chemical system of the mill in the manner described. When carrying out the conventional method (R7-process) as described, in comparison, the entire amount of this sulfur was released to the atmosphere.

The sulfur balances in the pulp manufacturing process when using the method according to the invention and when using conventional techniques, respectively, are evident from Table I.

TABLE I

|  | According to the invention (kg $SO_2$/ton of pulp) | According to conventional technique (kg $SO_2$/ton of pulp) |
| --- | --- | --- |
| Sulfur charge | | |
| Fresh sulfur to the chlorine dioxide plant | 0.4 | 12.1 |
| Sulfur to the tall oil cook | 3.5 | 3.5 |
| Sulfur accompanying fuel and wood | 1.0 | 1.0 |
| Total | 4.9 | 16.6 |
| Sulfur removed | | |
| Released to atmosphere | 0 | 11.7 |
| Released to recipient | 4.9 | 4.9 |
| Total | 4.9 | 16.6 |

The data show that by applying the method according to the invention it is possible to reduce or even prevent sulfur-containing gaseous emissions. This sulfur is instead recovered for useful purposes, namely, for use as a desired chemical in the manufacture of chlorine dioxide.

Having regard to the foregoing disclosure, the following is claimed as the inventive and patentable embodiments thereof:

1. A process for the recovery of sulfur dioxide liberated in the chemical pulping of lignocellulosic material, which comprises
   (1) collecting sulfur dioxide-containing gas emitted during the pulping and separating it into at least two portions;
   (2) contacting at least one portion with chlorine gas, thereby forming a gaseous mixture comprising sulfur dioxide and chlorine;
   (3) effecting reaction of said sulfur dioxide, said chlorine, and water to form hydrochloric acid and sulfuric acid while forming an intimate dispersion in said gaseous mixture of an aqueous mixed acid solution comprising hydrochloric acid and sulfuric acid;
   (4) dissolving said hydrochloric acid and said sulfuric acid in said aqueous mixed acid solution;
   (5) recovering said aqueous mixed acid solution and separating it from substantially sulfur dioxide-free residual gas; (6) washing the other portion of the sulfur dioxide-containing gas with the said aqueous mixed acid solution; and then
   (7) combining said other portion with the gaseous mixture containing sulfur dioxide and chlorine and washing both with said aqueous mixed acid solution, while effecting the reaction of sulfur dioxide and chlorine.

2. A process according to claim 1, in which the mixed acid solution containing sulfuric acid and hydrochloric acid comprises at least in part recycled mixed acid solution recovered from a previous reaction with sulfur dioxide-containing gas.

3. A process according to claim 2, in which the recycled mixed acid solution containing sulfuric acid and hydrochloric acid has an acid concentration within the range from about 2.5 to about 15 moles/l.

4. A process according to claim 1, in which the amount of chlorine in the chlorine-containing sulfur dioxide-containing gas mixture is sufficiently in excess of an equimolar ratio to sulfur dioxide to supply to the mixed acid solution an amount of free chlorine within the range from about 0.002 to about 1.3 mg/l.

5. A process according to claim 1, in which a stream of the gaseous mixture is passed in counterflow to a stream of finely divided mixed acid solution.

6. A process according to claim 1, in which mixed acid solution recovered from the process is used in the manufacture of chlorine dioxide.

7. A cyclic process for the recovery of sulfur dioxide liberated in the chemical pulping of lignocellulosic material in combination with the manufacture of chlorine dioxide from mixed hydrochloric and sulfuric acids, which comprises
   (1) collecting sulfur dioxide-containing gas emitted during the pulping and separating it into at least two portions;
   (2) contacting at least one portion with chlorine gas, thereby forming a gaseous mixture comprising sulfur dioxide and chlorine;
   (3) effecting reaction of said sulfur dioxide, said chlorine, and water to form hydrochloric acid and sulfuric acid while forming an intimate dispersion in said gaseous mixture of an aqueous mixed acid solution of hydrochloric acid and sulfuric acid;
   (4) dissolving said hydrochloric acid and said sulfuric acid in said aqueous mixed acid solution;
   (5) recovering said aqueous mixed acid solution and separating it from substantially sulfur dioxide-free residual gas;
   (6) reacting a portion of said recovered aqueous mixed acid solution with sodium chlorate to form chlorine dioxide and sodium sulfate;
   (7) recycling a portion of said recovered aqueous mixed acid solution to step (3);
   (8) washing the other portion of the sulfur dioxide-containing gas with the said aqueous mixed acid solution; and then
   (9) combining said other portion with the gaseous mixture containing sulfur dioxide and chlorine and washing both with said aqueous mixed acid solution, while effecting the reaction of sulfur dioxide and chlorine.

8. A cyclic process according to claim 7, which comprises recovering sodium sulfate in step (6) and recycling this to the chemical pulping cycle as a source of sulfur in a sufficient amount to maintain sulfidity and balance sulfur losses.

9. A cyclic process for the recovery of sulfur dioxide liberated in the chemical pulping of lignocellulosic material in combination with maintaining sulfur balance in the chemical pulping cycle, which comprises
   (1) collecting sulfur dioxide-containing gas emitted during the pulping and separating it into at least two portions;
   (2) contacting at least one portion with chlorine gas, thereby forming a gaseous mixture comprising sulfur dioxide and chlorine;

(3) effecting reaction of said sulfur dioxide, said chlorine, and water to form hydrochloric acid and sulfuric acid while forming an intimate dispersion in said gaseous mixture of an aqueous mixed acid solution of hydrochloric acid and sulfuric acid;

(4) dissolving said hydrochloric acid and said sulfuric acid in said aqueous mixed acid solution;

(5) recovering said mixed acid solution and separating it from substantially sulfur dioxide-free residual gas;

(6) recycling a portion of said recovered mixed acid solution to the chemical pulping cycle as a source of sulfur in a sufficient amount as $H_2SO_4$ to maintain sulfidity, and balance sulfur losses;

(7) recycling a portion of said recovered mixed acid solution to step (3);

(8) washing the other portion of the sulfur dioxide-containing gas with the said aqueous mixed acid solution; and then (9) combining said other portion with the gaseous mixture containing sulfur dioxide and chlorine and washing both with said aqueous mixed acid solution, while effecting the reaction of sulfur dioxide and chlorine.

* * * * *